INVENTOR
Alger G. Maranville
BY
Evans + McCoy
ATTORNEYS

Patented Mar. 14, 1933                                                1,901,759

UNITED STATES PATENT OFFICE

ALGER G. MARANVILLE, OF AKRON, OHIO, ASSIGNOR TO THE GENERAL TIRE & RUBBER COMPANY, OF AKRON, OHIO, A CORPORATION OF OHIO

AIRPLANE LANDING WHEEL

Application filed January 18, 1930. Serial No. 421,665.

This invention relates to airplane landing wheels of the type in which a pneumatic tire of relatively great radial depth is mounted directly on a hub adapted to be secured on the axle of the landing gear of an airplane.

Tires of landing wheels are apt to be subjected to very severe lateral thrusts which tend to tear the tire from the hub and which are apt to damage the tire.

The question of providing a more efficient rigid connection between the tire and the hub is becoming more important with the development of braking equipment, and particularly so in the larger and heavier types of aircraft.

The present invention has for its object to provide a landing wheel in which the pneumatic tire is so constructed and so attached to the hub that it may be subjected to very severe lateral thrusts without being dislodged from the hub and without being damaged.

A further object is to provide a pneumatic tire with a substantially rigid reinforced interior or base portion which may be rigidly attached to the hub and which is of sufficient strength to resist without distortion very severe lateral thrusts.

In addition, the invention has for an object to provide a landing wheel which can be quickly and easily assembled and mounted on an axle.

With the above and other objects in view, the invention may be said to comprise the landing wheel as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
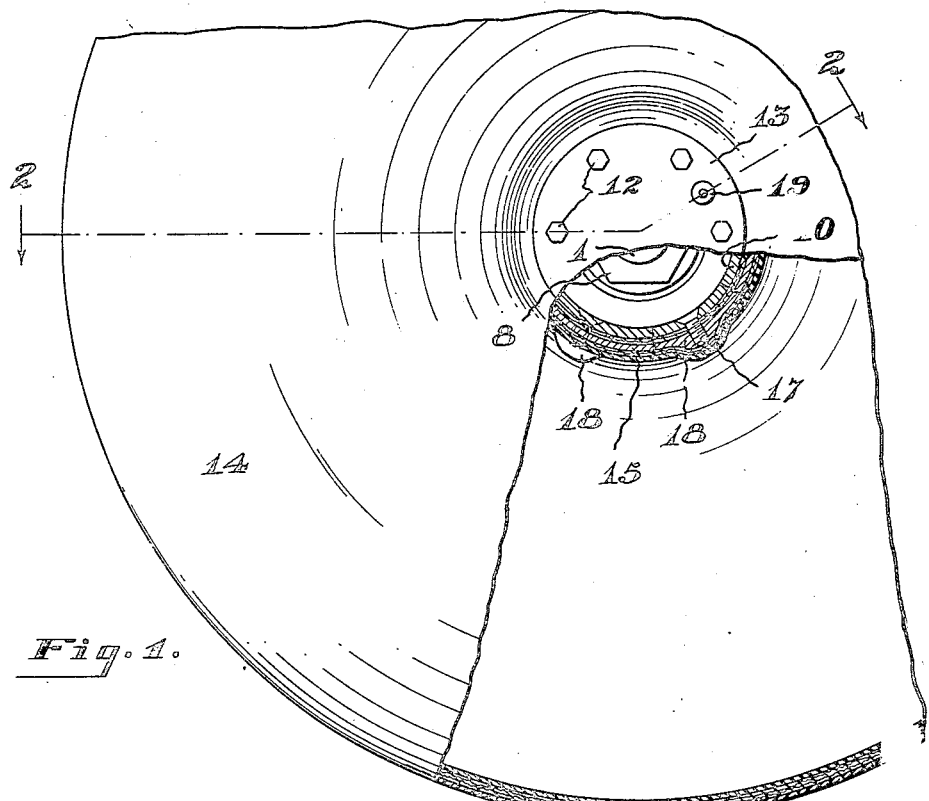
Figure 1 is a fragmentary side elevation of a wheel embodying the invention, a portion of the tire and hub being broken away and shown in section.
Figure 2:
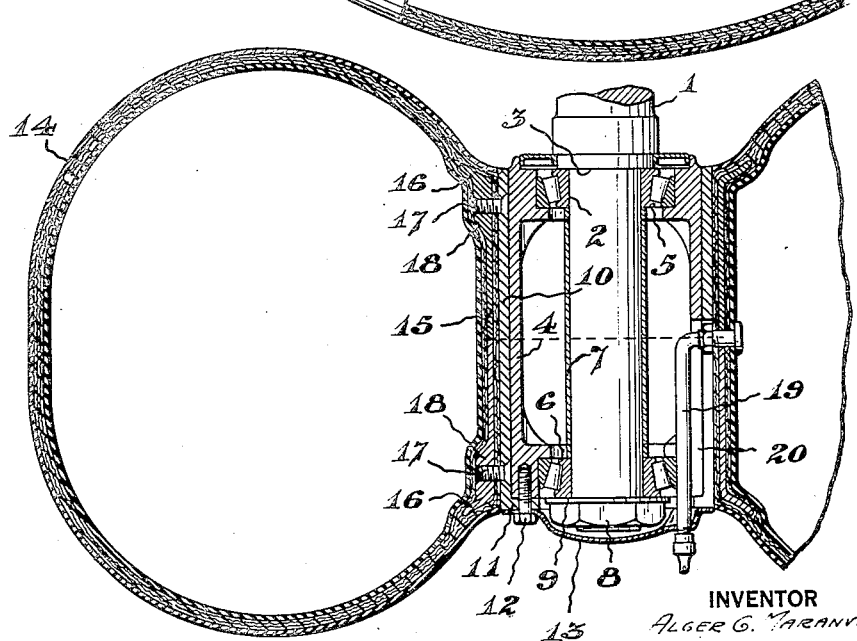
Fig. 2 is an axial section through the wheel assembled on an axle.

In Figs. 1 and 2 of the drawings, the wheel of the present invention is shown mounted upon an axle 1 which is provided with a cylindrical bearing portion 2 and with a shoulder 3 at the inner end of the bearing portion. A hub 4 is detachably mounted on the axle 1 and is rotatably supported on the axle by inner and outer thrust roller bearings 5 and 6. The inner bearing 5 has its inner race ring seated against the shoulder 3 and the outer bearing 6 is positioned on the axle by means of a spacing sleeve 7 interposed between the inner race rings of the bearings. The hub is clamped on the axle by means of a nut 8 and washer 9 on the outer end of the axle by means of which the inner race ring of the outer bearing is clamped against the outer end of the spacing sleeve 7 and the inner race ring of the inner bearing 5 is clamped between the inner end of the sleeve 7 and the shoulder 3 on the axle. The hub 4 may be of cylindrical form and carries a tire supporting sleeve 10 which fits closely thereon, the sleeve 10 being provided with an inwardly projecting flange 11 at its outer end which bears against the outer end of the hub and is rigidly secured thereto by means of bolts 12. The outer bearing and the outer end of the hub may be protected by a sheet metal cap 13 secured upon the flange 11 of the sleeve by means of the bolts 12.

The sleeve 10 forms a support for a pneumatic tire 14, which is a fabric reinforced rubber tire of tubular form. The interior or base portion of the tire 14 is substantially rigid and of cylindrical form, being of a diameter to fit snugly upon the sleeve 10.

The interior or base portion of the tire is reinforced by a pair of endless metal bands 15 abutted against each other in axial alinement, and which, when abutted against each other, extend substantially the full width of the base portion of the tire. Each band 15 has an outer side flange 16 projecting outwardly a short distance into the side walls of the tire. The reinforcing bands 15 are preferably wholly embedded in the tire and are rigidly attached to the sleeve 10 by means of bolts 17 which extend through the sleeve 10 and are screwed into threaded sockets formed in thickened portions 18 of the bands 15.

To enable the tire to be inflated, the tire may be provided with a bent valve stem 19 which extends through the base of the tire into a slot 20 formed in the hub and longitudinally of the hub through the cap 13.

The tire 14 with its attached supporting sleeve 10 may be readily removed from the hub by removing the bolts 12 and sliding the sleeve outwardly on the hub. After the tire and sleeve have been removed from the hub, the tire can be readily removed from the sleeve 10 after removing the bolts 17 connecting the sleeve and the reinforcing bands 15 of the tire. The tire may thus be readily removed and replaced.

The reinforcing bands 15 may be formed in a single piece, if desired, but it is preferable to form them as shown, so that in case the tire is punctured, the bands can be separated a sufficient amount to permit the fabric to be cut. The valve 19 can then be removed and a new tube inserted within the tire. By forming the tire in this manner, a satisfactory repair can be made, which will be sufficient until a new tire can be obtained. It is obvious that this obviates the necessity of carrying a complete extra tire in the plane.

Figure 3:
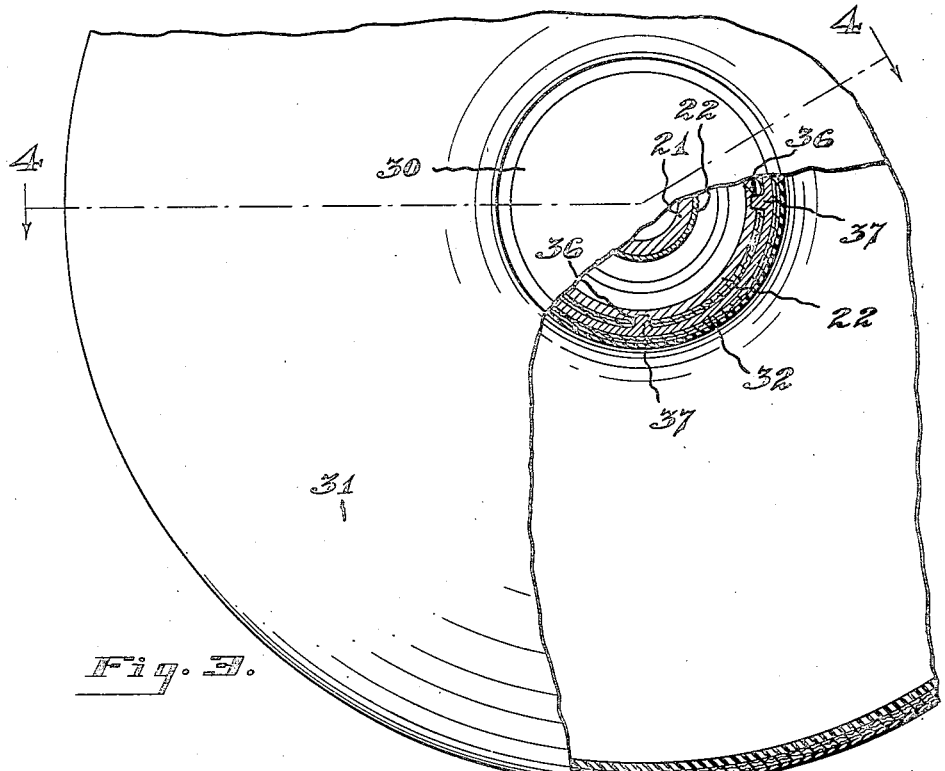
Fig. 3 is a fragmentary side elevation of a wheel embodying a modifying form of the invention, a portion of the tire and hub being broken away and shown in section.
Figure 4:
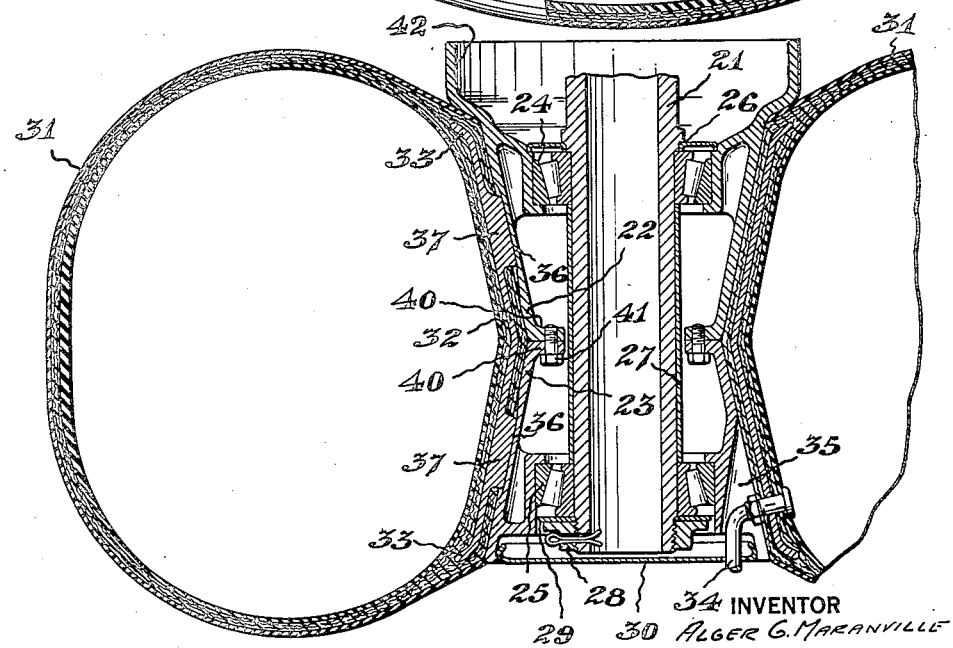
Fig. 4 is an axial section through the wheel shown in Fig. 3.

In Figs. 3 and 4 of the drawings, the hub is shown mounted upon an axle 21 and is composed of an inner section 22 and an outer section 23. The external surfaces of the two hub sections are conical, the inner section tapering outwardly and the outer section tapering inwardly to provide a peripheral tire receiving channel. The inner hub section 22 is supported upon a thrust roller bearing 24 and the outer hub section 23 is supported upon a removable thrust roller bearing 25. The inner race ring of the bearing 24 is seated against a shoulder 26 on the axle and the inner race rings of the two bearings are spaced by means of the sleeve 27. The hub sections 22 and 23 are formed with peripheral flanges 40 at their inner edges which are drawn toward each other by suitable bolts or cap screws 41 to securely clamp the tire body in place on the sections 23. The hub sections are clamped on the axle by means of a nut 28 and washer 29 which clamp the inner race ring of the removable outer bearing 25 against the outer end of the spacing sleeve 27 and the inner race ring of the inner bearing 24 between the inner end of the spacing sleeve 27, and the shoulder 26. The outer end of the axle and the bearing 25 may be protected by a suitable sheet metal cap 30 secured in the end of the hub.

The inner hub section 22 may, if desired, be formed with a separate or integral brake drum 42, as shown in Fig. 4 for use with suitable brake equipment.

The two part hub provides a support for a pneumatic tire 31 which, as in the modification first prescribed, is of tubular form and composed of rubber reinforced with a suitable number of plies of tire reinforcing fabric. The tire 31 has its base or interior portion reinforced by an endless abutting metal band 32 which is of channel form and of a width substantially equal to the length of the hub. The band 32, which is wholly embedded in the base wall of the tire has outwardly extending flanges 33 at the inner and outer sides thereof and has its base portion tapering from the inner and outer sides toward the center to conform substantially to the conical peripheral surfaces of the inner and outer sections 36 of the hub. If desired, however, the reinforcing member 32 may be formed in two pieces to permit the tire to be slit, so that in case of a puncture, a new tube can be inserted. The tire may be provided with a valve stem 34 which extends through the base portion of the tire adjacent the outer side thereof into a notch 35 formed in the outer end of the hub. The valve stem 34 is preferably bent and extends laterally through the cap 30.

In order to prevent circumferential movements of the tire on the hub, each of the hub sections is provided with longitudinally extending grooves 36 which receive inwardly projecting lugs 37 formed integrally with the reinforcing band 32 and projecting through the rubber covering the interior of the band. The lugs 37 provide a rigid interlock between the rigid reinforcing band of the tire and the hub to positively hold the tire against circumferential movements on the hub.

In assembling the tire on the hub, the inner and outer sections 22 and 23 of the hub may be readily inserted into opposite ends of the central aperture of the tire, the groove 36 of the hub section being alined with the lugs 37 of the reinforcing band 32 of the tire. When the hub is clamped in place on the axle 21, the rigid base portion of the tire is securely clamped between the oppositely tapering sections of the hub. By reason of the rigid construction of the interior or base portion of the tire, the tire is adapted to withstand severe lateral thrusts without distortion and without damage to the tire.

By reason of the wide rigid base portion of the tire in engagement with the tapered hub sections throughout their circumference, the tire is rigidly held against relative movements with respect to the hub. Furthermore, the construction of the hub and tire is such that the tire may be very quickly and easily removed and replaced.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An airplane landing wheel comprising a hub, an annular tire having the form of an endless tube and having a circumferentially and transversely continuous wall at the interior thereof formed to fit on said hub, a metal reinforcing band embedded in the wall of the tire, and means forming a rigid connection between the hub and reinforcing band for positively holding the tire against circumferential movements on the hub.

2. An airplane landing wheel comprising a hub, an annular tire having the form of an endless fluid tight tube and having a substantially rigid circumferentially and transversely continuous interior wall of a form to fit on said hub, and means for rigidly interlocking the rigid wall of the tire with opposite end portions of the hub to positively hold the tire against circumferential movements on the hub.

3. An airplane landing wheel comprising a hub, an annular tire having the form of an endless fluid tight tube having a substantially rigid circumferentially and transversely continuous interior wall of a form to fit on said hub, and means for detachably securing the rigid wall of the tire on the hub and for interlocking said rigid wall with opposite end portions of the hub to positively hold the tire against circumferential movements on the hub.

4. An airplane landing wheel comprising a hub, an annular tire having the form of an endless fluid tight tube and having a circumferentially and transversely continuous interior wall formed to fit on said hub and of a width corresponding substantially to the length of the hub, an annular metal band embedded in the interior wall of the tire, and means connecting said hub and band adjacent opposite ends of the hub for positively holding the tire against circumferential movements on the hub.

5. An airplane landing wheel comprising a hub, an annular tire having the form of an endless fluid tight tube and having a circumferentially and laterally continuous interior wall formed to fit on said hub and of a width corresponding substantially to the length of the hub, an annular metal band extending substantially the full width of said interior wall and embedded therein throughout the circumference thereof, and means rigidly connecting the hub and band adjacent opposite ends of the hub for positively holding the tire against circumferential movements on the hub.

6. An airplane landing wheel comprising a hub, an annular tire having the form of an endless fluid tight tube having a transversely and circumferentially continuous interior wall formed to fit on said hub, an annular metal band embedded in the interior wall of the tire, and means forming a rigid interlock between the hub and band adjacent opposite ends of the hub to hold the tire against lateral and circumferential movements on the hub.

7. An airplane landing wheel comprising a hub, an annular tire having the form of an endless fluid tight tube having a transversely and circumferentially continuous interior wall formed to fit on said hub of a width corresponding substantially to the length of the hub, an annular metal band extending substantially the full width of said interior wall and embedded therein throughout the circumference thereof, means for detachably securing said tire on the hub, and means forming a rigid interlock between the hub and band adjacent opposite edges of said interior wall to positively hold the tire against circumferential movement on the hub.

8. An annular tire having the form of an endless tube which is continuous circumferentially and in radial section, said tube having an annular metal band embedded in the interior wall thereof, said band extending substantially the full width of said interior wall.

9. An annular tire having the form of an endless tube which is continuous circumferentially and in radial section, said tube having an annular metal band embedded in the interior wall thereof, said band extending substantially the full width of said interior wall, said band having integral driving lugs projecting from the interior thereof beyond the surface of the interior wall.

10. The combination with an axle, of a hub composed of an inner and an outer section having exterior conical surfaces tapering outwardly and inwardly, means for detachably mounting the hub on the axle, an annular tire having the form of an endless fluid tight tube, an annular metal band embedded in the wall of the tire at the interior of the annulus, said band having oppositely tapering side portions conforming substantially to the oppositely tapering surfaces on the hub, and means forming a rigid interlock between said band and said hub sections to positively hold the band against circumferential movements on the hub.

11. The combination with an axle, of a hub composed of an inner and an outer section having exterior conical surfaces tapering outwardly and inwardly, means for detachably mounting the hub on the axle, an annular tire having the form of an endless fluid tight tube, an annular metal band embedded in the wall of the tire at the interior of the annulus, said band having oppositely tapering side portions conforming substantially to the oppositely tapering surfaces on the hub, said hub and band having interfitting lugs and grooves forming a positive driving connection between them.

12. The combination with an axle, of a hub composed of an inner and an outer section having exterior conical surfaces tapering outwardly and inwardly, means for detachably mounting the hub on the axle for rotation thereon, an annular tire having the form of an endless fluid tight tube, an annular metal band embedded in the wall of the tire at the interior of the annulus, said band having oppositely tapering side portions conforming substantially to the oppositely tapering surfaces on the hub, and means forming a rigid interlock between said band and said hub sections to positively hold the band against circumferential movements on the hub.

13. The combination with an axle having a peripheral shoulder spaced inwardly from its outer end, an inner bearing having a ring bearing against said shoulder, a spacing sleeve on the axle bearing at its inner end on said ring, an outer bearing having a ring engaging the outer end of said sleeve, means for clamping the latter ring against the outer end of the sleeve, inner and outer hub sections carried by said bearings, said hub sections having oppositely tapering outer surfaces, and a tire having a substantially rigid interior wall clamped between the oppositely tapering surfaces of the hub.

In testimony whereof I affix my signature.

ALGER G. MARANVILLE.